United States Patent [19]
Rock et al.

[11] Patent Number: 5,555,481
[45] Date of Patent: Sep. 10, 1996

[54] METHOD OF PRODUCING SOLID PARTS USING TWO DISTINCT CLASSES OF MATERIALS

[75] Inventors: Stephen J. Rock; Charles R. Gilman, both of Troy, N.Y.

[73] Assignee: Rensselaer Polytechnic Institute, Troy, N.Y.

[21] Appl. No.: 509,730

[22] Filed: Aug. 1, 1995

Related U.S. Application Data

[63] Continuation of Ser. No. 152,406, Nov. 15, 1993, abandoned.

[51] Int. Cl.$^6$ .................................. B44C 1/22; B22F 7/02
[52] U.S. Cl. ............................... 419/30; 419/45; 419/56; 29/420.1; 29/239
[58] Field of Search ............................... 419/30, 45, 56; 29/426.1, 239

[56] References Cited

U.S. PATENT DOCUMENTS

| | | | |
|---|---|---|---|
| 4,247,508 | 1/1981 | Housholder | 264/219 |
| 4,414,028 | 11/1983 | Inoue | 419/31 |
| 4,752,352 | 6/1988 | Feygin | 156/630 |
| 4,830,822 | 5/1989 | Ward | 428/547 |
| 4,863,538 | 9/1989 | Deckard | 156/62.2 |
| 4,961,154 | 10/1990 | Pomerantz et al. | 364/522 |
| 5,038,014 | 8/1991 | Pratt et al. | 219/121.64 |
| 5,126,529 | 6/1992 | Weiss et al. | 219/121.6 |
| 5,203,944 | 4/1993 | Prinz et al. | 156/247 |
| 5,204,055 | 4/1993 | Sachs et al. | 419/2 |
| 5,207,371 | 5/1993 | Prinz et al. | 228/125 |
| 5,260,009 | 11/1993 | Penn | 264/40.1 |
| 5,354,414 | 10/1994 | Feygin | 156/630 |

OTHER PUBLICATIONS

Marcus, Beaman, Barlow and Bourell; "From Computer to Component in 15 Minutes: The Integrated Manufacture of 3-Dimensional Objects"; *Journal of Metals*; Apr., 1990; pp. 8–10.

*Rapid Prototyping Report* The newsletter of the desktop manufacturing industry; vol. 3, No. 9; Sep., 1993; pp. 1–8.

Zong, Carnes, Wheat and Marcus; "Solid Freeform Fabrication by Selective Area Laser Deposition"; Center for Materials Science & Engineering The University of Texas at Austin, Austin, Texas; pp. 83–90.

Badrinarayan and Barlow; "Metals Parts From Selective Laser Sintering of Metal–Polymer Powders" from Solid Freeform Fabrication Proceedings; Sep., 1992 sponsored by the University of Texas at Austin; pp. 141–146.

Michaels, Sachs, and Cima; "Metal Parts Generation by 3–Dimensional Printing" from Solid Freeform Fabrication Proceedings; Sep., 1992 sponsored by The University of Texas at Austin; pp. 244–250.

Allanic, Medard and Schaeffer; "Stereophotolithography: A Brand New Machinery" from Solid freeform Fabrication Proceedings; Sep., 1992 sponsored by The University of Texas at Austin; pp. 260–271.

Beck, Prinz, Siewiorek, Weiss; "Manufacturing Mechatronics Using Thermal Spray Shape Deposition"; from Solid Freeform Fabrication Proceedings; Sep. 1992 sponsored by The University of Texas at Austin; pp. 272–279.

(List continued on next page.)

*Primary Examiner*—Charles T. Jordan
*Assistant Examiner*—Daniel Jenkins
*Attorney, Agent, or Firm*—Heslin & Rothenberg, P.C.

[57] ABSTRACT

A method of producing parts from two distinct classes of materials utilizes depositing a first class material and a second class material on a deposition surface where the first class material forms a three-dimensional shape defined by the interface of the first class material and the second class material. The first class material is unified and the second class material is removed therefrom to form a three-dimensional part of the first class material. Preferably, the first and second class materials are deposited in layers.

20 Claims, 9 Drawing Sheets

OTHER PUBLICATIONS

Dickens, Pridham, Cobb, Gibson and Dixon; "Rapid Prototyping Using 3–D Welding" from Solid Freeform Fabrication Proceedings; Sep., 1992 sponsored by The University of Texas at Austin; pp. 280–290.

Stratasys, Inc.; "New Dimensions in Fused Depositions Modeling (FDM)" from Proceedings of the 2nd European Conference on Rapid Prototyping and Manufacturing; Jul., 1993; pp. 217–225.

Schwartz; "Cubital's High Throughput Rapid Prototyping Systems: A Solider Approach to Modelling" from Proceedings of the 2nd European Conference on Rapid Prototyping and Manufacturing; Jul., 1993; pp. 239–245.

Bowman; "Cad to Product—The Lom Route"; from Proceedings of the 2nd European Conference on Rapid Prototyping and Manufacturing; Jul., 1993; pp. 269–278.

Bryant and Jenkins; "Sprayed Metal Deposition"; from Proceedings of the 2nd European Conference on Rapid Prototyping and Manufacturing; Jul., 1993; pp. 291–301.

METHOD OF PRODUCING SOLID PARTS USING TWO DISTINCT CLASSES OF MATERIALS

This application is a continuation of application Ser. No. 08/152,406, filed Nov. 15, 1993, now abandoned.

BACKGROUND OF THE INVENTION

1. Technical Field

This invention relates to a method and apparatus for producing solid parts by exploiting differences in material properties between two material classes with distinctly different behavioral characteristics at certain thermal, mechanical, and chemical environmental conditions. In particular, this invention relates to a controlled material handling and processing apparatus which deposits a plurality of materials to form a spatially controlled material composition powder mass which may be subsequently subjected to appropriate thermal, mechanical, and chemical environmental conditions to unify one material class into a three dimensional part. The material(s) of the other class will remain separated and able to be removed, or alternatively, the other material(s) will be unified but distinctly separate from the first material class and, subsequently removable, thus freeing the three dimensional solid part.

2. Description of Relevant Art

The advancements of Computer-Aided Design (CAD) systems and computer graphics technology have provided for significant increases in design capability. Designs can be modeled and visualized in three dimensions, and in some cases simulations of physical phenomena can be performed. There are times, however, when a computer generated image cannot serve as an adequate substitute for a physical part. Employing conventional manufacturing processes to manufacture such parts is often time consuming and costly. When relatively small quantities of a given part are required and a conventional manufacturing process is used, material removal processes such as milling, drilling, grinding, and lathe cutting are most often used. These subtractive processes involve removing material from an initial piece of stock material. These processes may require the following: multiple tool changes, tool path planning, fixturing and subsequent re-fixturing, and significant operator intervention. These factors increase the time and cost of producing a part, and slow the product design and evaluation cycle.

Rapid Prototyping is commonly known as a broad class of specific processes which can produce a small quantity of physical parts in a relatively short time. Rapid Prototyping processes can produce physical parts which accurately represent "final part" geometry. As is known in the art, there is a difference between a form part, which essentially models the shape of the "final part" while providing only minimal structural strength, and a functional part which models the shape of the "final part", provides structural strength and accurately represents the desired properties of the "final part". The majority of existing Rapid Prototyping processes produce only form prototypes. When structural strength comparable to that achieved by conventional manufacturing processes is required, a secondary manufacturing process, in addition to a Rapid Prototyping process, is usually used to create a functional part. Most existing Rapid Prototyping processes are limited, either by the materials on which they can operate, by their accuracies or by the part geometries which they can produce.

A particular class of Rapid Prototyping technologies has developed significantly in recent years and is termed Solid Freeform Fabrication ("SFF"). SFF processes are primarily material addition processes where parts are fabricated via the additive composition of raw material rather than the subtractive material removal operations (which begin with an initial material block). SFF processes are typically driven by computer solid model information and tend to minimize human intervention required between the design of a part and its physical realization using such a system. Benefits of such approaches include minimizing material waste, low per-part setup cost, independence from part specific hard tooling, and no cutter path planning. Moreover, many SFF processes do not require fixtures or manual part re-positioning during part production. In some cases, it is possible to integrate assembly of multiple parts by fabricating them in their final assembled configuration. Using SFF, complex part geometries, some unrealizable from conventional manufacturing processes, can be produced. Most existing SFF processes can only be used for the production of form prototypes, disposable tooling, and patterns for secondary manufacturing processes such as investment casting.

There are other manufacturing processes which utilize material additive techniques. Welding, plasma spray, and plating are examples; however, these processes create parts given some initial geometry defining material substrate. Moreover, recently developed Solid Freeform Fabrication processes are capable of creating parts in a layer-wise fashion without requiring an initial geometry defining substrate. Examples of such fabrication processes are disclosed in U.S. Pat. Nos. 4,575,330; 4,752,353; and 4,863,538. These recent uses of layer-wise additive manufacturing techniques have been largely limited to producing form parts which are of relatively weak physical strength and/or parts with homogeneous material properties. Furthermore, many processes are limited to producing parts composed of specific polymer materials because of the solidification mechanism employed. For example, Stereolithography and Solid Ground Curing which rely on light induced chemical reactions to form solid material, are limited to operate on photo-polymer resins.

It is therefore desirable to utilize an additive material manufacturing process which may be used to produce functional parts in single quantities and small lot sizes.

It is also desirable to utilize a technique which places minimal restriction on the variety of materials which can be processed.

It is also desirable to utilize an additive manufacturing technique which is capable of creating parts with spatially controlled material compositions therein.

It is also desirable to achieve an apparatus for performing the aforementioned part manufacturing process which may be driven by a computer utilizing solid model information.

SUMMARY OF THE INVENTION

The desired results may be achieved by a method of producing parts using two distinct classes of materials in accordance with the present invention. Using this method, a first class material and second class material are deposited on a surface wherein the first class material forms a three-dimensional shape defined by the interface of the first class material and the second class material; the first class material is unified by subsequent processing; and the second class material is removed from the three-dimensional part formed of the first class material. The first class material and second class material may be deposited in layers in accordance with information defining the desired part and process models.

The process may also involve compacting the deposited first class and second class materials. A computer may be used to determine the thickness of the layers of the first class and second class materials deposited. Each layer of first class material and second class material deposited may be separately compacted and successive layers may also be collectively compacted. Preferably, the first and second class materials may be a powder. A chemical additive, such as a binder, lubricant, or reaction inhibiting agent, may be used with the first class and/or second class material.

A computer may control the location on the surface where the first class material and second class material are deposited for each layer. A deposition effector may be used to deposit the first class material and the second class material. The deposition effector may be capable of traversing arbitrary paths above the deposition surface to selectively deposit first class and second class materials at various locations on the deposition surface. The deposition effector may be controlled by a computer and is capable of depositing the first class and second class material at discrete point locations and along curved paths.

The unified first class material may have a spatially controlled material composition comprising one or more distinct types of material. The first class material being deposited may be deposited in continuously varying compositions of distinct materials in three-dimensional space to form a part with spatially controlled material composition.

The method may also include depositing an initial layer of second class powdered material capable of acting as a buffer of separated material between a first surface and a first class powder material; compacting the second class powder material to a prescribed compaction pressure or volume; depositing a layer of selectively placed powder materials comprising first class material and second material wherein the first class material deposited corresponds to a region of a part cross-section. The aforementioned steps may be repeated to form a series of layers of deposited materials, the layers of deposited materials may be compacted and the second class material may be removed and the first class material unified. Alternatively, the second class material may remain until the first class material is unified and the second class material is then removed.

Unifying the first class material may be performed by exposing the layers of materials to an elevated temperature and/or pressure which will not unify the second class material. Alternatively, unifying may be performed in an environment which selectively chemically activates the layered material to effect unification of the first class material while leaving the second class material separate. Also, the second class material may be unified during processing, but able to be separated from the first class material, for example, by mechanical or chemical means, such as fracture or etching, without effecting the first class material.

The first class material and second class material may be compacted by a compaction system having a punch with a die cavity therein, a first punch having a deposition surface engaged thereto and being vertically translatable within the cavity thereby moving the vertical position of the deposition surface within the cavity; a means for moving the deposition effector at various locations above the deposition surface to allow the deposition effector to deposit materials at preselected positions on the deposition surface; a second punch being vertically translatable and having a contact surface capable of contacting materials deposited on the deposition surface.

BRIEF DESCRIPTION OF THE DRAWINGS

The present invention will be better understood from the following description of certain embodiments thereof with reference being made to the accompanying drawings in which.

DETAILED DESCRIPTION

Figure 1:
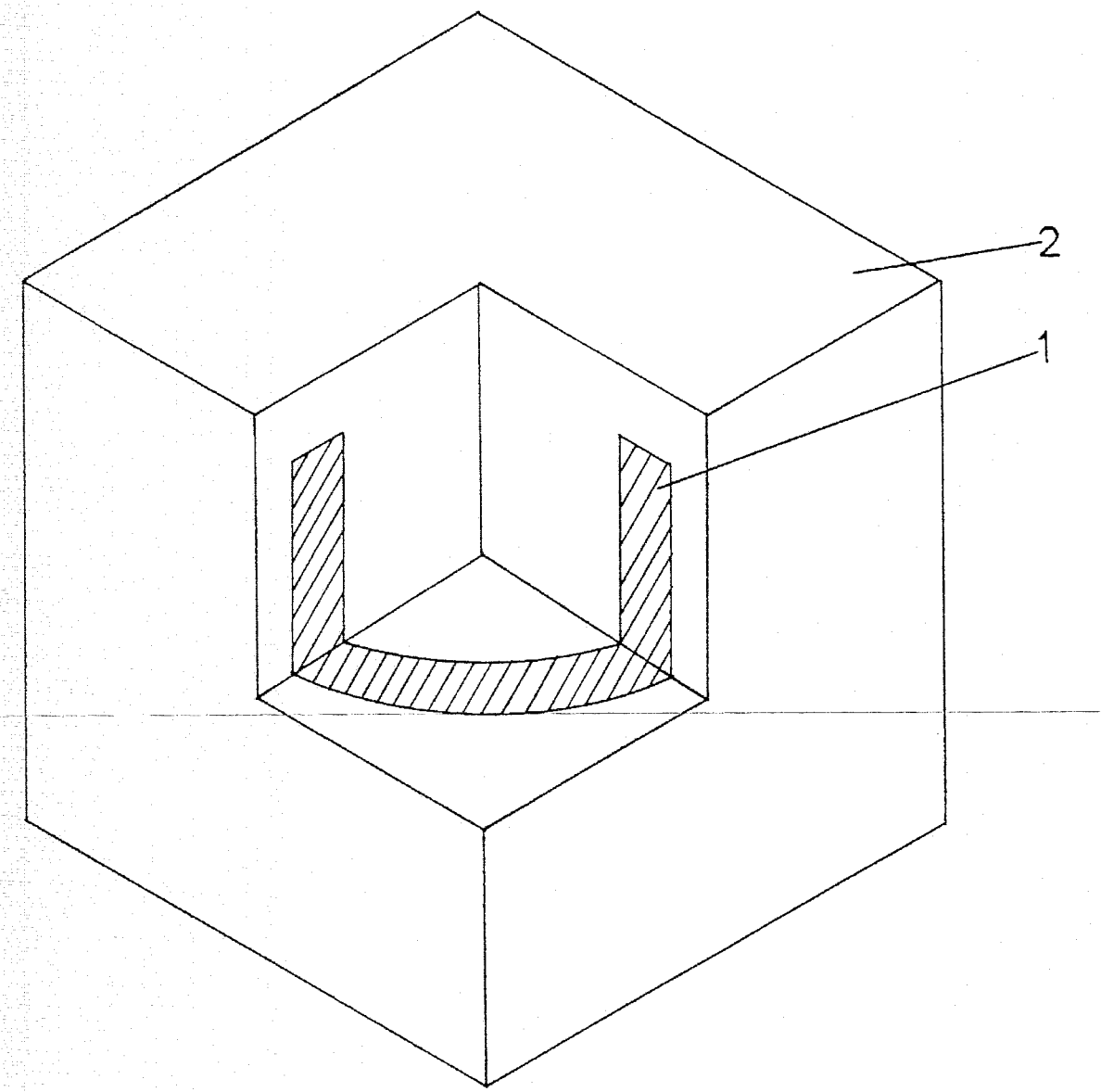
FIG. 1 is a perspective cut-away view of cylindrical shaped part of first class material encased in a rectangular mass of second class material in accordance with the principles of the present invention.

The method of the present invention exploits differences in material properties between two material classes with distinctly different behavioral characteristics at certain thermal, mechanical, and/or chemical environmental conditions such that one material class results in a solid mass after processing while all other material classes remain in their original state and can be removed to yield some desired net shape part; or alternatively, the other material class may unify but remain distinct and separable from the solid mass representing a desired part by other operation.

As used herein, unify (or any derivation thereof) is used to mean any of the following operations or any combination thereof: consolidate, sinter, solidify, and adhesive bond. Each of these terms is defined below:

Consolidation converts loose powder into a material mass with sufficient strength for subsequent handling. Interparticle bonds which form during consolidation provide green strength to the material mass. Mechanical interlocking under consolidation forces, and due to irregular particle shape, plays a major role in green strength development during consolidation. Another mechanism for green strength formation is the development of cold welds at the interparticle contacts.

Sintering is the process whereby particles bond together at temperatures typically below the melting point by atomic transport events. The driving force of sintering is a reduction in the system free energy, manifested by decreased curvatures and an elimination of surface area. For metal powders, the mechanisms are usually diffusion processes with surface, grain boundary or lattice paths.

Solidification is the result of a phase change from the liquid state to the solid state, which may be the case when liquid phase sintering is performed, or more generally, when material is raised above its melting point and then allowed to cool below this temperature.

Adhesive Bonding is the process where an additive is used to produce a physical connection between the particles in the material mass.

For purposes of this description, the materials involved in this invention are defined in terms of material classes. First class material is defined as material which will unify to form an inseparable material mass under certain thermal, mechanical, and/or chemical environmental conditions. Second class material is defined as material which will not unify (i.e., is separate) to form an inseparable material mass under identical thermal, mechanical, and/or chemical environmental conditions. Second class material is also defined as material which will unify to form an inseparable material mass under identical thermal, mechanical, and chemical environmental conditions provided that it can be later separated from first class material by means of some additional operation, such as mechanical means which may include fracture, or chemical means, which may include etching. The method of the present invention is not limited to specific materials, but rather, it is applicable to polymers, metals, ceramics, and any composite mixtures of materials, providing different unification responses can be established for two groups or classes of materials at a given set of thermal, mechanical, and/or chemical environmental conditions.

The present invention may be achieved using a material deposition subsystem, material compaction subsystem, and a unification subsystem. The material deposition subsystem selectively fills a cavity, preferably, in a layer-wise fashion, with a plurality of material layers; each of which may contain a selectively placed combination of first class and second class materials. The material compaction subsystem compresses the first and second class material. The unification subsystem exposes the first class and second class deposited and compacted materials to conditions which facilitate unification.

Figure 2:
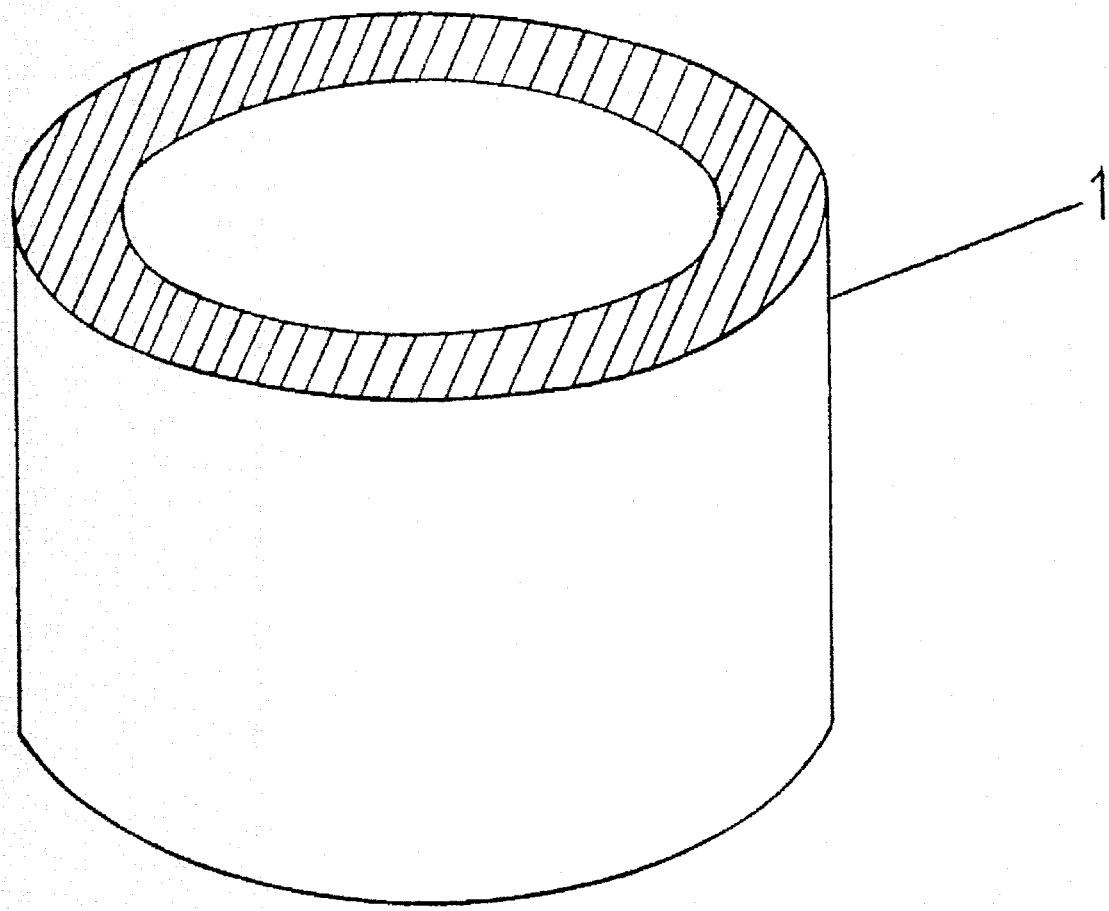
FIG. 2 is a perspective view of the cylindrical shaped part of FIG. 1 formed of first class material which results after processing and removal of the second class material in accordance with the principles of the present invention.

Referring now to FIG. 1, a rectangular mass of material formed using the principles of the present invention is shown. The mass consists of a first class material 1 deposited in such a manner so as to form a desired part after compaction and unification. The mass also includes second class material which was deposited along with the first class material and surrounds the first class material in three dimensions. The shape of the first class material is dictated by its boundary with other materials including second class material 2. After processing, the material other than first class material 1 can be removed resulting in the finished product made of first class material 1 depicted in FIG. 2. In accordance with the present invention, the desired shape of the resultant product formed from the first class material 1 is achieved by depositing the first class material and second class material, preferably in layers, so that the shape of the first class material and resultant product therefrom is defined by the interface of the first class material with other materials such as second class materials.

Figure 3:
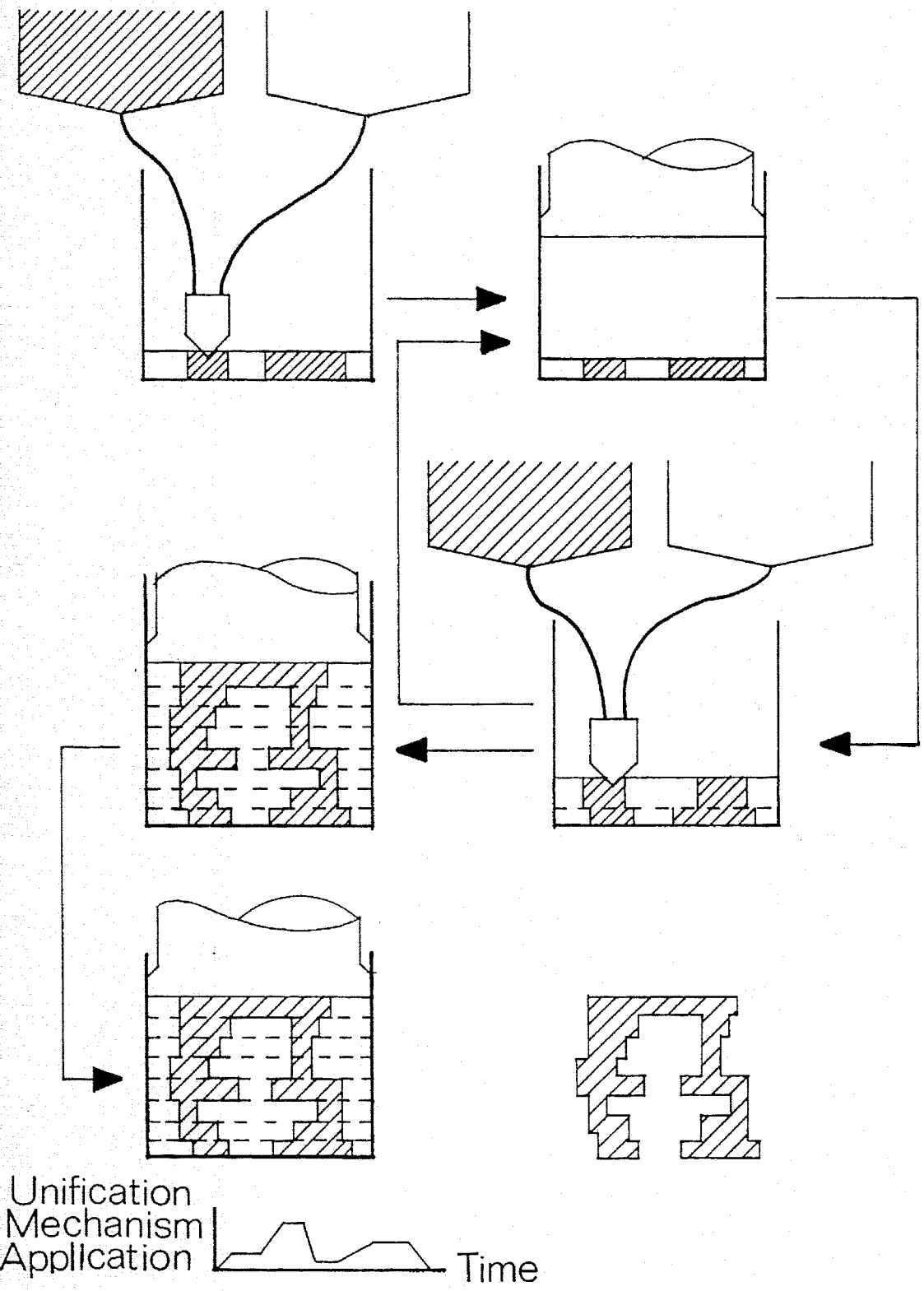
FIG. 3 is a schematic illustration showing the successive selective material deposition and periodic layer-wise compaction, followed by final compaction and unification to create a solid part in accordance with the principles of the present invention.

Referring to FIG. 3, the deposition of first class material 1 and second class material 2 will now be described. Using a material deposition subsystem, first class material stored within a first means 3 and second class materials stored within a second means 5 are deposited using a deposition effector 7 on a surface 9. Preferably, the first class material 1 and second class material 2 are deposited in layers. As shown in FIG. 3, a first layer 11 is deposited by deposition effector 7 by selectively depositing first class material 1 and second class material 2 in predetermined locations wherein the first class material will form a portion of a cross-section of a resultant part.

After depositing the first class material and second class material in the first layer 11, the first layer may be compacted using the compaction subsystem having a press 13 therein to facilitate the contact between the layers of deposited materials. After depositing of the first layer 11, a second layer 12 may then be deposited thereon by the deposition effector 7. Again, the location of the first class material within the second layer is predetermined to correspond to a portion of the cross-section of the desired resultant part. The material other than first class material, such as the second class material, is used to define the location of the first class materials within the layers. Therefore, the shape of the resultant part is defined by the interface between the first class and second class materials. After depositing the second layer 12 of first class material and second class material, the second layer may then be compacted using the compaction subsystem having its press 13. As shown in FIG. 3, this cycle may be repeated for successive layers of deposited first class material and second class material. The successive layers form a three dimensional mass of material, such as that depicted in FIG. 1, having a first class material therein defined in three dimensions by the locations of materials other than first class material, such as second class material. The amount of compaction required of each individual layer is determined through consideration of the type of material used as first class material and second class material and the resultant physical properties desired in the final part. After the final successive layer has been deposited and compacted, the resultant mass of material may be unified using a unification subsystem.

As described above, unification includes, for example, consolidation, sintering, solidification and adhesive bonding or any combination thereof. After unification, the material other than first class material, such as second class material depicted in FIG. 3, may be removed from the first class material and the resultant first class material forms the desired part. First class materials may include, for example, iron, copper, nickel, and titanium. Second class material may include, for instance, alumina ($Al_2O_3$).

Figure 4:
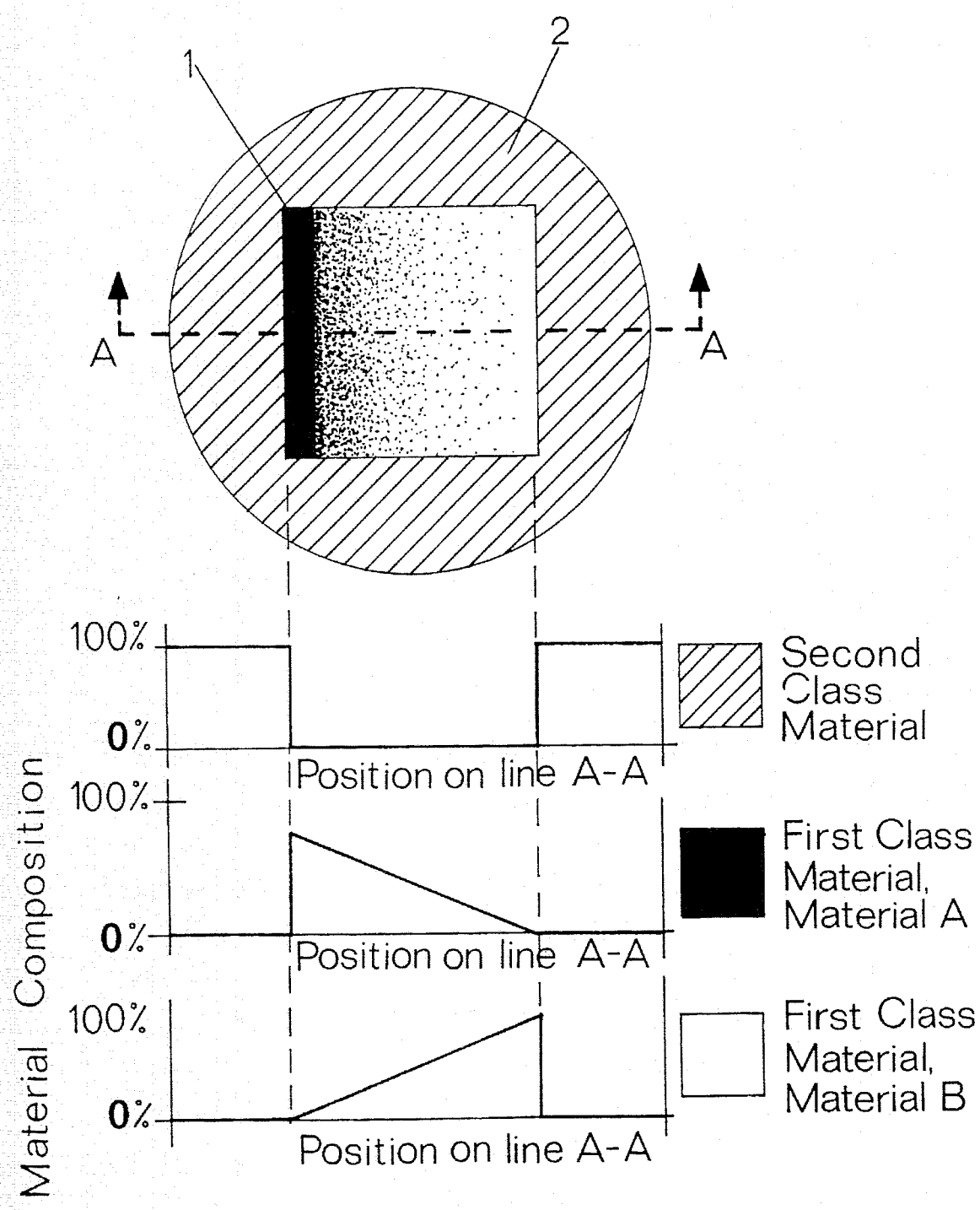
FIG. 4 is a schematic illustration of a spatially controlled material composition part encased in a circular cavity filled with second class material produced in accordance with the principles of the present invention and corresponding material composition graphs which indicate the percentage of each constituent material or material class along the position of the horizontal section plane indicated by the dashed line which intersects the circular cavity.

The first class material may comprise a mixture of different materials each having different physical properties. The mixture may vary at different points within the first class material whereby the resultant part may have different and/or distinct material composition at different locations therethrough. For example, as shown in FIG. 4, the first class material may comprise a material A and a material B which are surrounded in consecutive layers by a second class material. FIG. 4 shows a top view of a two dimensional part of a cross-section of a mass of deposited material having first class material 1 defined by the interface of the first and second class materials and surrounded by second class material 2. The first class material is a mixture of material A and material B. However, the mixture of material A in proportion to material B varies along the horizontal length of the cross-sectional area along line A—A. The composition of each material in the mass of material is graphically shown in FIG. 4 along line A—A. The mixture is not limited to any number of materials. Moreover, the variations in the mixture may occur in all three dimensions of the first class material.

Preferably, the apparatus of this invention is controlled by a computer which processes three-dimensional solid model information defining the geometry and other attributes of a part, such as material composition. The computer must determine or be programmed with process parameters such that process deformations, such as those induced by compaction, may be estimated and compensated for, and material appropriately deposited such that after processing by the method of this invention, the desired part geometry will be realized. After compensating for process deformations, the model may be intersected by planar surfaces, or sliced, at periodic intervals along one direction of the part where each slice corresponds to one material layer. If, within each material layer, sequential material deposition is used it will also be necessary to compute deposition paths which determine the sequence and surface locations at which material must be deposited.

Figure 5:
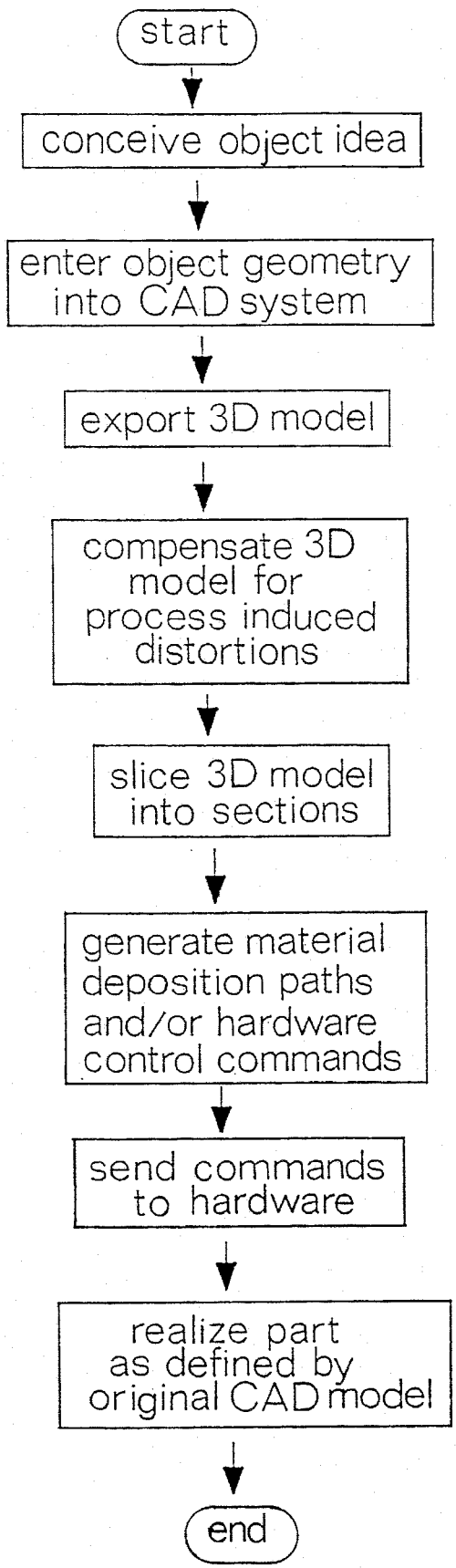
FIG. 5 is a flow diagram depicting the operations which occur to convert three-dimensional solid model information into low-level control information useful for controlling the apparatus used to produce parts in accordance with the principles of the present invention.

FIG. 5 depicts a flow chart of the operations which may be used to achieve a part produced in accordance with the present invention. A person of ordinary skill in the art may vary or alter the steps to suit particular needs. Initially, an object is conceived in order to be used for a particular purpose. After conception of the object, the object may be modeled in a computer aided design (CAD) system, which can model the object's geometry and also its material composition in three-dimensional space. The three dimensional geometry in the CAD system may then be exported into, for example, an inverse geometry computer which will alter the three dimensional model to compensate for process induced distortions which occur when material classes are compacted and/or unified. The computer will calculate the amount of distortion which will occur when the material classes are processed by pressure, temperature and/or chemical reaction. The amount of distortion will depend upon a number of material properties and process parameters, such as powder shape, and compaction pressure. After the model has been modified to compensate for the process induced distortions, the model may be sliced into sections or layers. A process controller or deposition path computer may be used to then generate material deposition paths for each sliced layer. Commands relating to the deposition paths will be sent to a deposition effector controller which will control material deposition for each layer of material comprising at least first class material and second class material. The deposited layers may be compacted by the compaction subsystem and unified by the unification subsystem.

Figure 6:
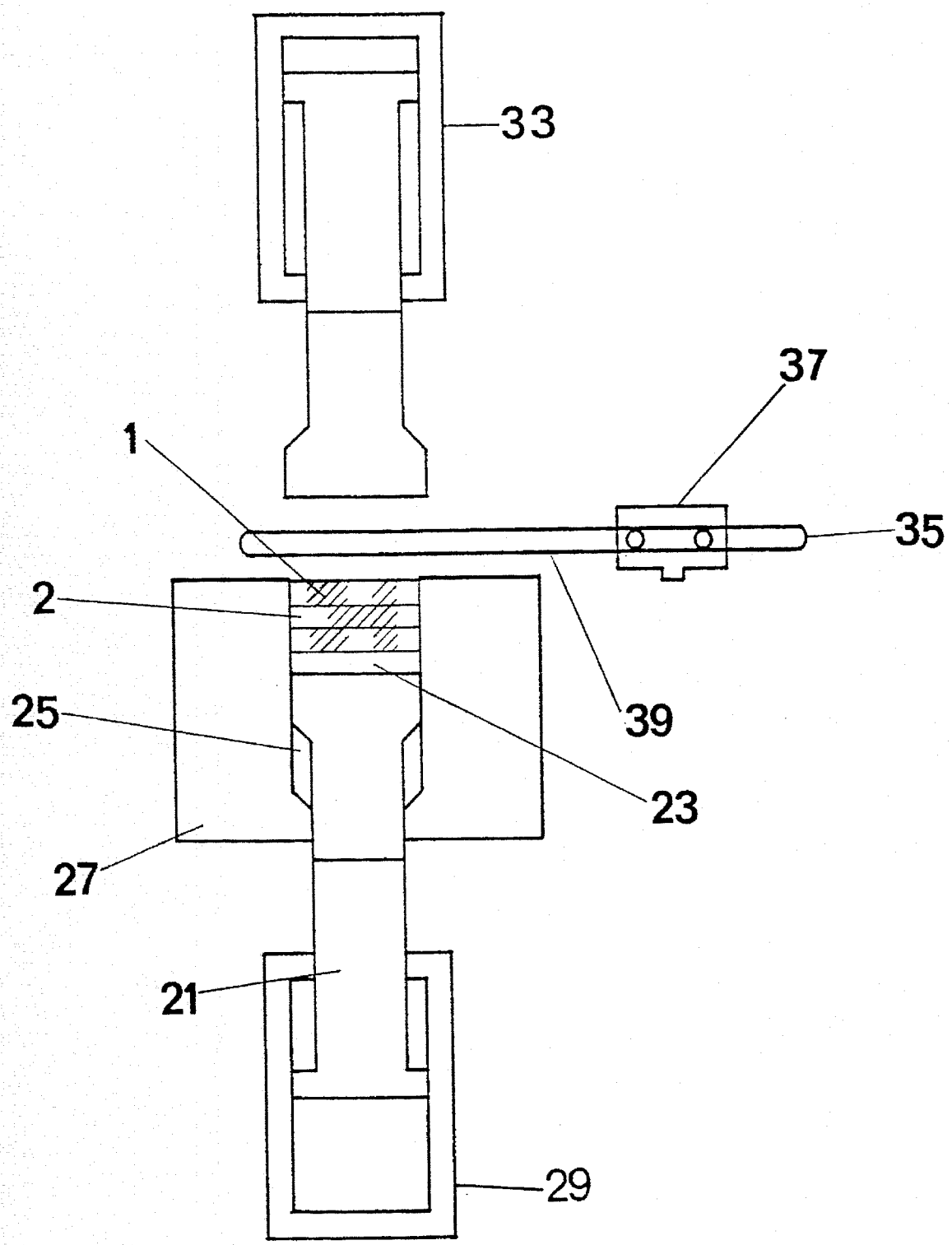
FIG. 6 is a schematic illustration of an apparatus used to produce parts in accordance with the principles of the present invention including the integration of a powder deposition subsystem and material compaction subsystem.

FIG. 6 depicts a schematic representation of a compaction subsystem and material deposition subsystem. The compaction subsystem comprises a compaction means which may include one or more presses. As shown in FIG. 6, a first punch 21 is located such that a deposition surface 23 is within the cavity 25 of a die 27. The first punch (or bottom punch) 21 is driven by a first actuator 29 which may be hydraulically or electromechanically driven. The compaction subsystem may also include a second punch (or top punch) 31 located such that a contact surface thereof aligns with the deposition surface 23 of the first punch 21 such that material mass deposited on the deposition surface 23 can be contacted by second punch 31 when the second punch 31 is activated. The second punch may be activated by a second actuator 33 which may also be hydraulically or electromechanically driven.

For each layer or cross-section, materials of first class and second class are selectively deposited such that first class material is placed where solid part material must be formed and second class material is placed where solid part material must not be formed. The compaction subsystem may be periodically enabled to perform some amount of compaction, either to a prescribed compaction pressure, a prescribed compacting distance, or a combination of both, after a predetermined number of material layers have been deposited. Compaction may also take place after all material layers have been deposited. Similarly, the unification subsystem may be enabled periodically as layers are deposited or enabled only after all material layers comprising the part have been deposited.

As shown in FIG. 6, first class material 1 and second class material 2, preferably deposited in layers, may be deposited on the deposition surface 23 of first punch 21 to be compacted by activating first punch 21 or second punch 31 such that second punch 31 contacts the top surface of the deposited material whereby both punches exert a force to compact the deposited materials. The materials may be deposited by a deposition subsystem 35.

Figure 8:
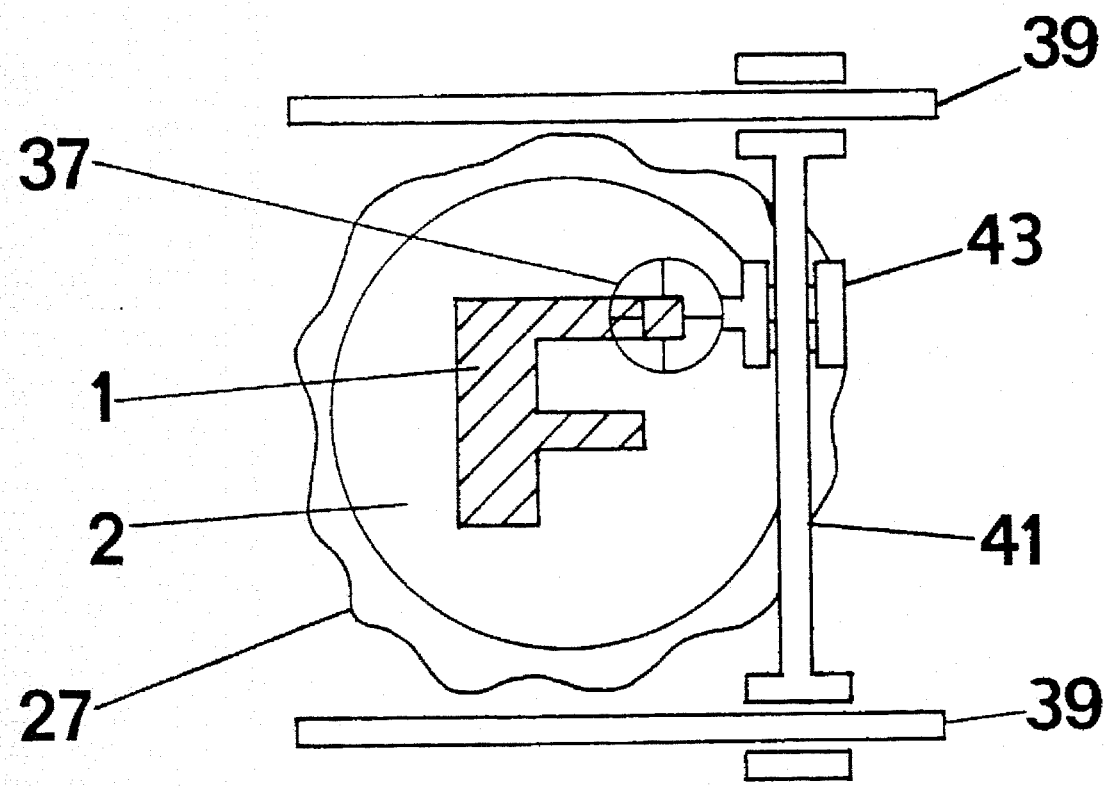
FIG. 8 is a schematic illustration of one embodiment of a serial deposition system used to deposit first class material and second class material in accordance with the principles of the present invention.

The deposition subsystem may contain a deposition effector 37 which deposits first class material and second class material on the deposition surface 23. Referring to conventional X-Y coordinate directions, the deposition effector 37 may be translated in the X horizontal direction by an X horizontal direction deposition effector guide 39. The deposition effector 37 may be directed into a Y vertical position by a Y deposition effector guide 41 (FIG. 8). A computer may control the deposition effector 37 to position it in the proper location above the deposition surface 23 for the deposition of first class material and second class material at desired locations corresponding to desired part cross-section information.

Figure 7A:
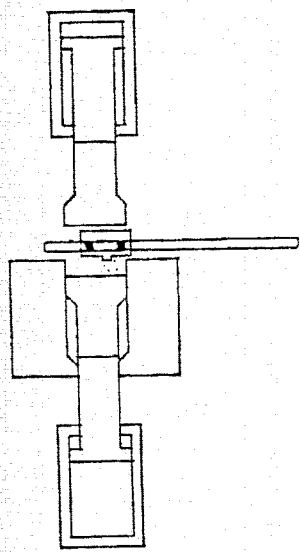
FIGS. 7A–7F are schematic illustrations depicting a sequence of operations for the apparatus depicted by FIG. 6.
Figure 7B:
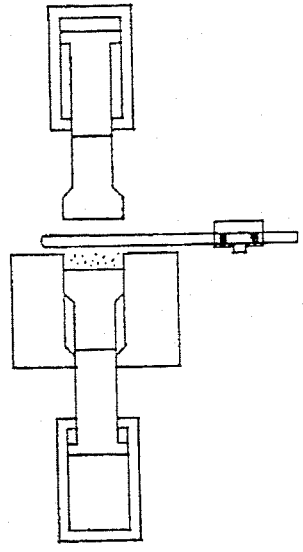
Figure 7C:
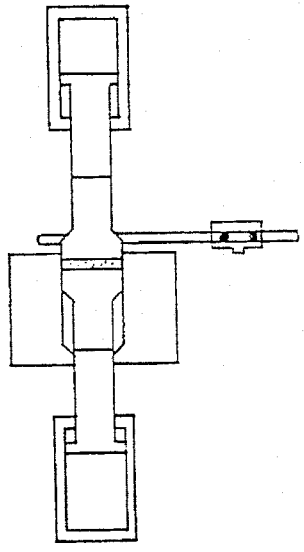
Figure 7D:
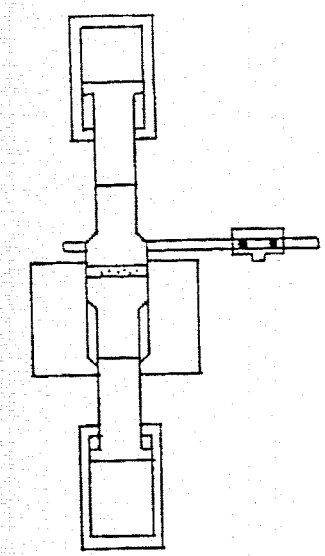
Figure 7E:
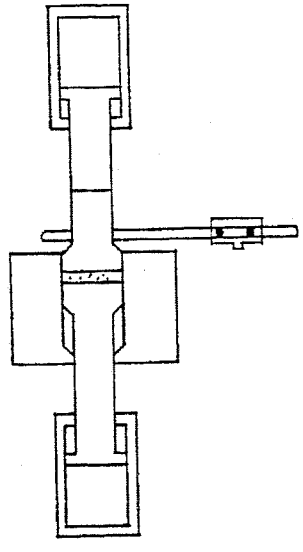
Figure 7F:
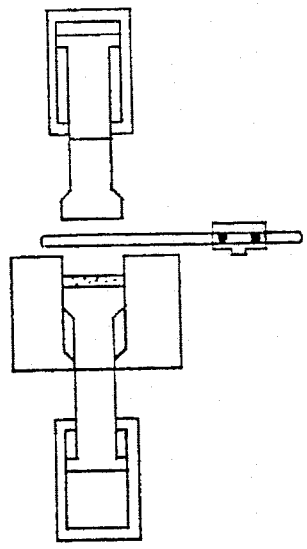

FIGS. 7A through 7F depict the compaction and deposition subsystems operated in accordance with the principles of the present invention to deposit a single layer of material on the deposition surface. In FIG. 7A, the deposition effector is moved in the desired locations to deposit a first layer of first class and/or second class material. Preferably, the first layer deposited should be a layer of second class material to enable the desired part comprised of first class material to be completely within a mass of second class material. In the next step, depicted in FIG. 7B, the deposition effector is retracted to allow compaction of the first layer of materials. As shown in FIG. 7C, the second press is activated to contact the deposited materials on the deposition surface and compact said materials between the first and second punch. After the second punch pressure is reduced, in FIG. 7D, the first punch pressure is decreased thus allowing the second punch to push both the powder mass and the first punch deeper into the die cavity to lower the deposition surface to allow room for the deposition of the second layer of first class and/or second class materials as shown in FIG. 7E. As shown in FIG. 7F, the second press may be retracted to allow the deposition effector to be translated above the deposition surface and deposit the first and second class materials in the proper locations thereon.

Referring to FIG. 8, the material deposition subsystem depicted in FIG. 6 and 7 is more particularly disclosed. The deposition effector 37 is coupled to a deposition trolley 43 which slides along a Y position direction deposition guide 41. The position deposition guide 41 slides relative to the X position deposition effector guide 39 and 39'. Using this type of material deposition subsystem, first class material and second class material may be deposited through the deposition effector 37 at locations along the surface to be deposited thereupon. By depositing first class or second class material until the deposition surface has completely covered with material, the deposition subsystem depicted in FIG. 8 is capable of performing serial deposition.

Figure 9:
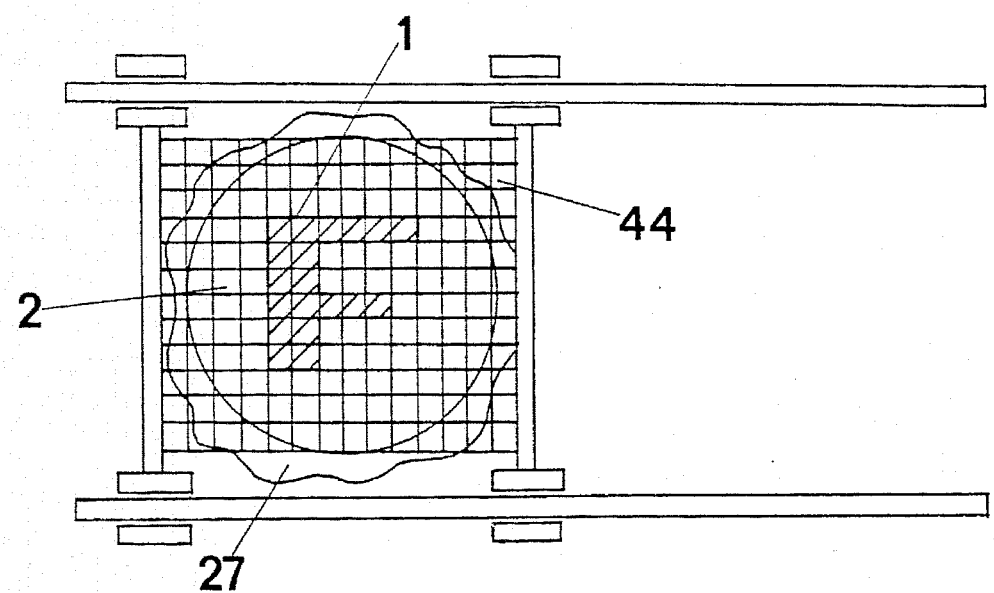
FIG. 9 is a schematic illustration of one embodiment of a parallel deposition system used to deposit first class and second class material in accordance with the principles of the present invention.
Figure 10:
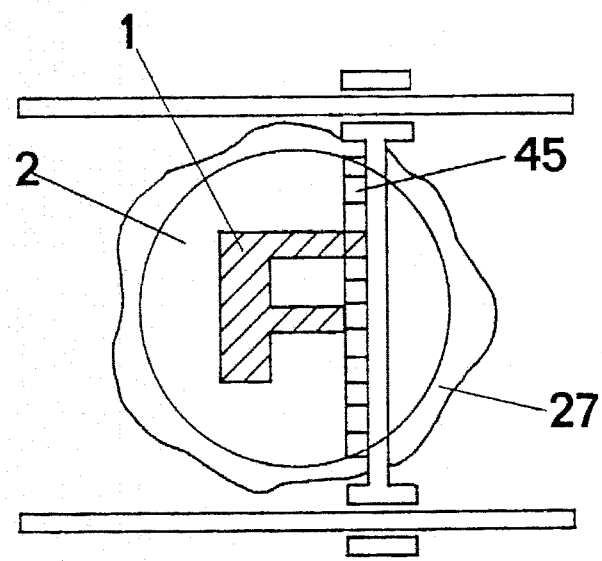
FIG. 10 is a schematic illustration of one embodiment of an alternative parallel deposition system used to deposit first class and second class material in accordance with the principles of the present invention.
Figure 1:
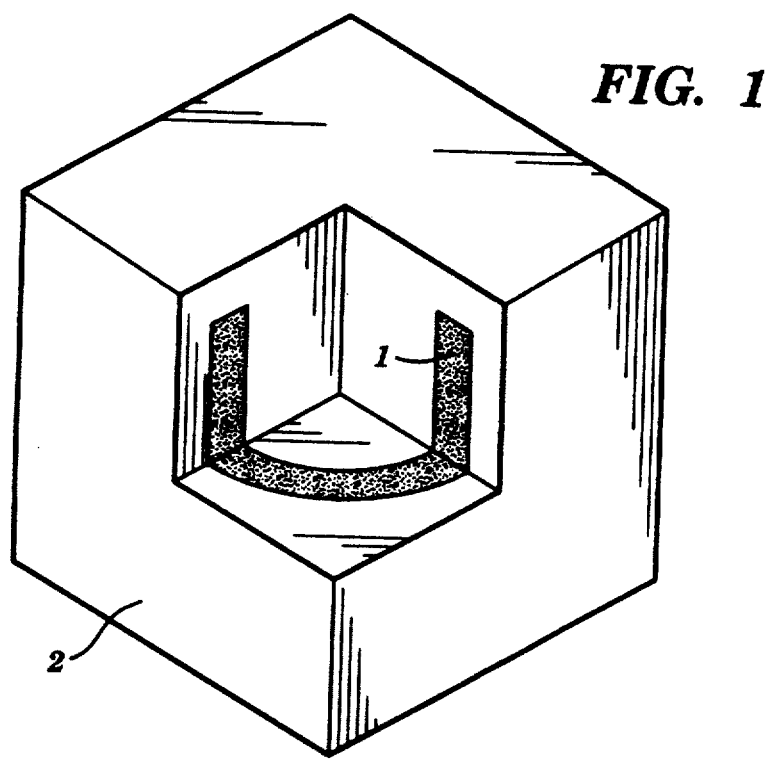
Figure 2:
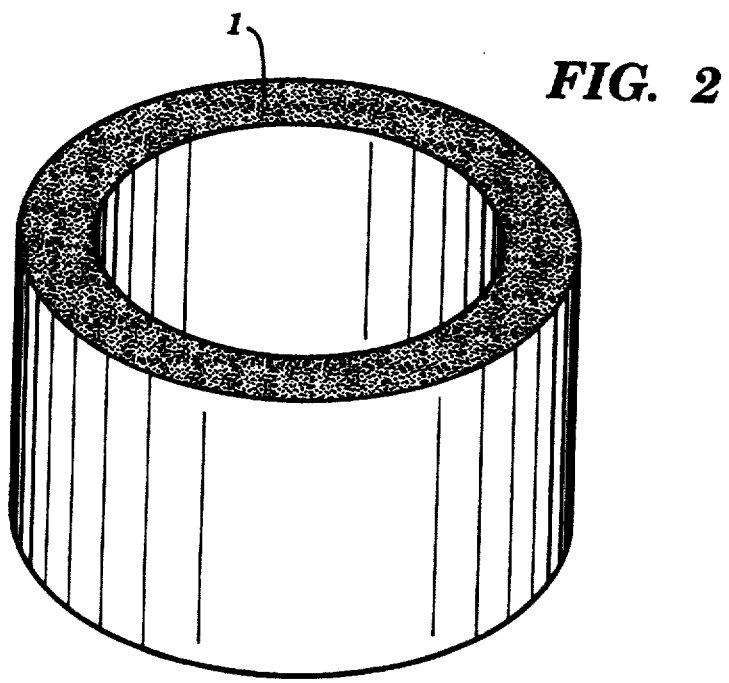
Figure 3:
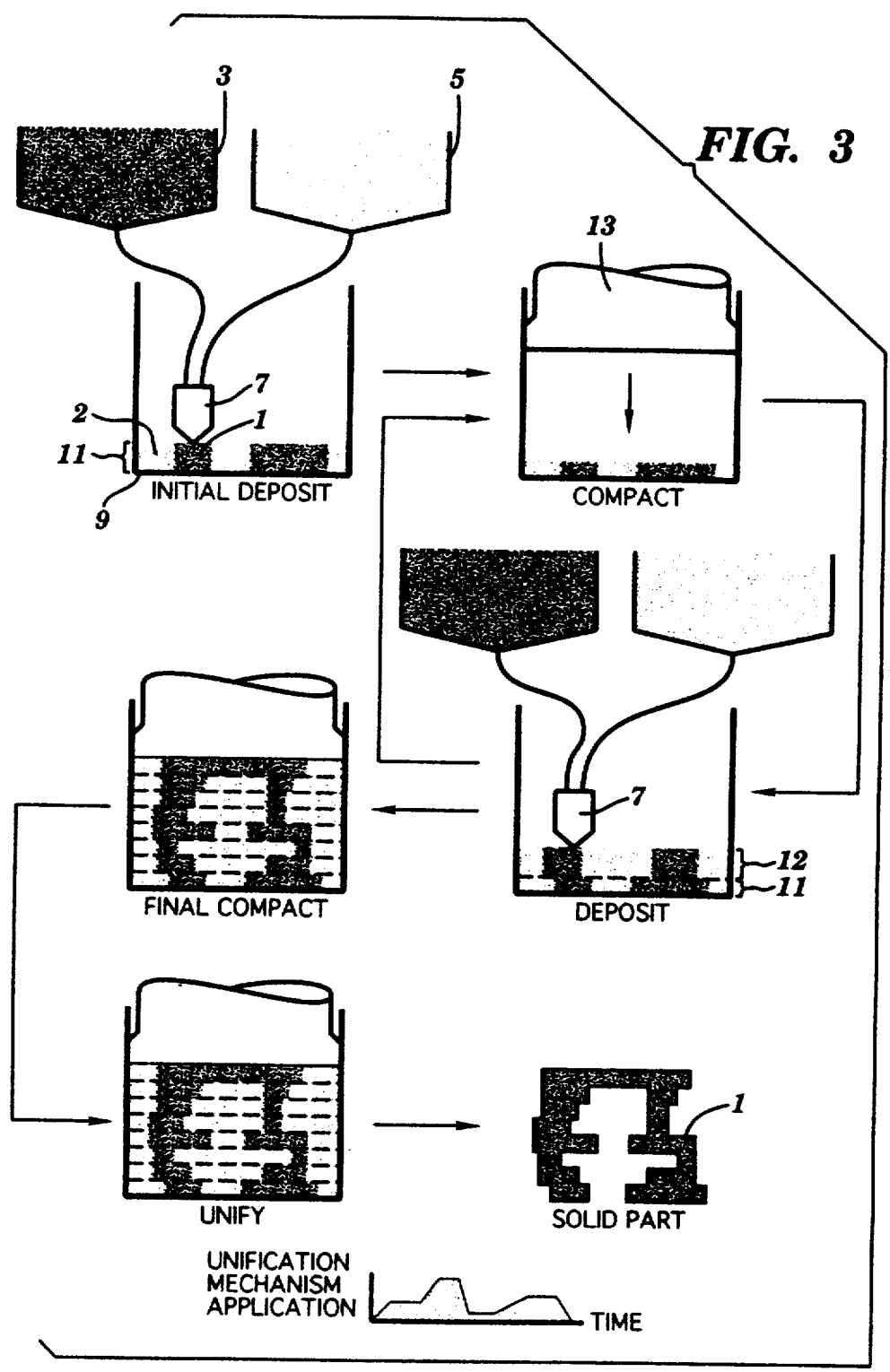
Figure 4:
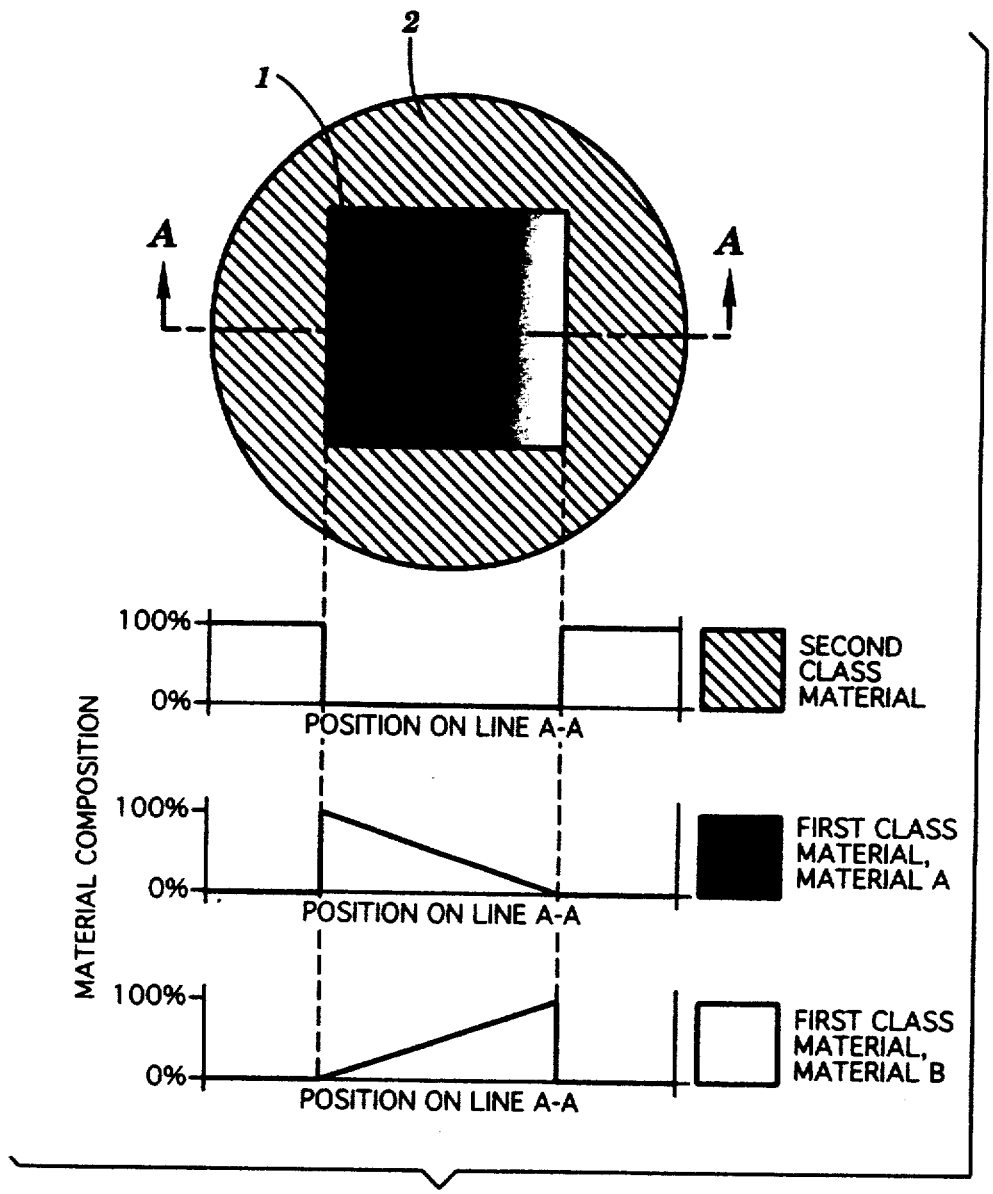
Figure 5:
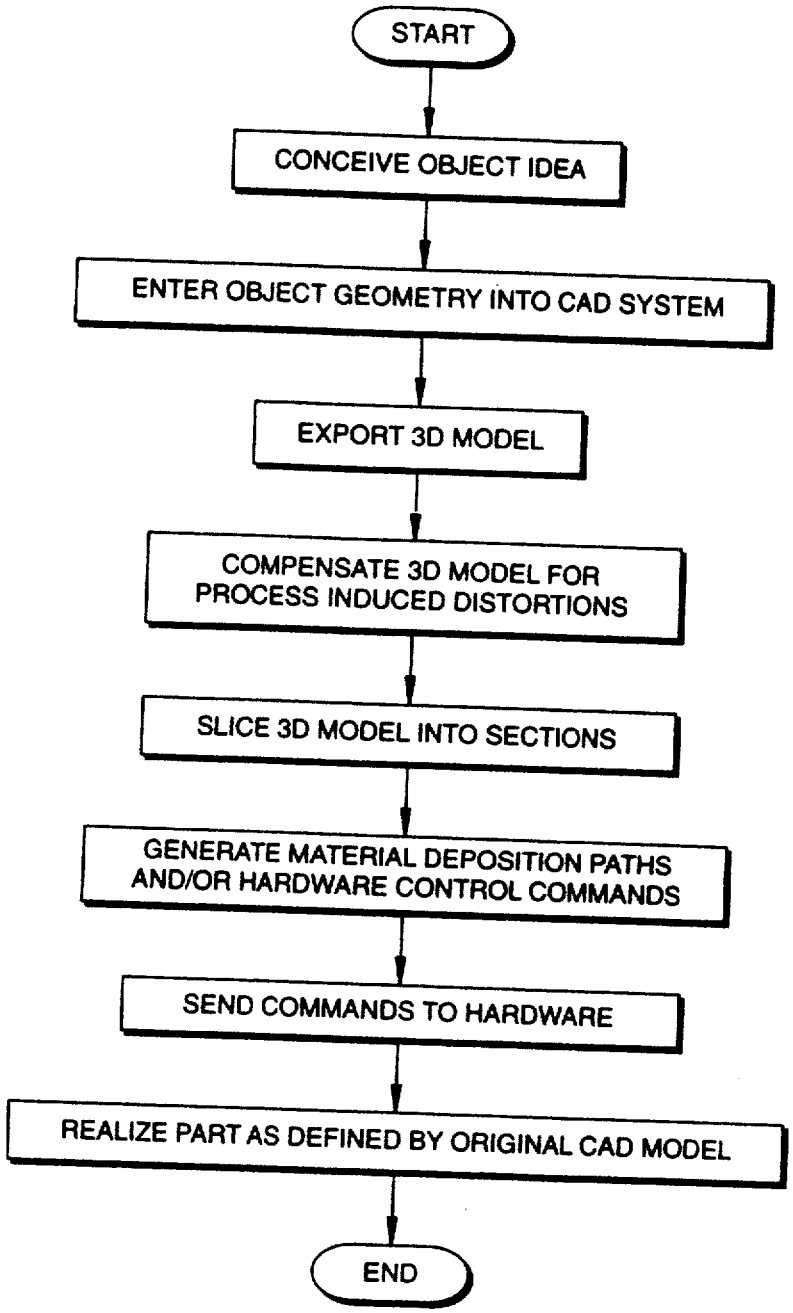
Figure 6:
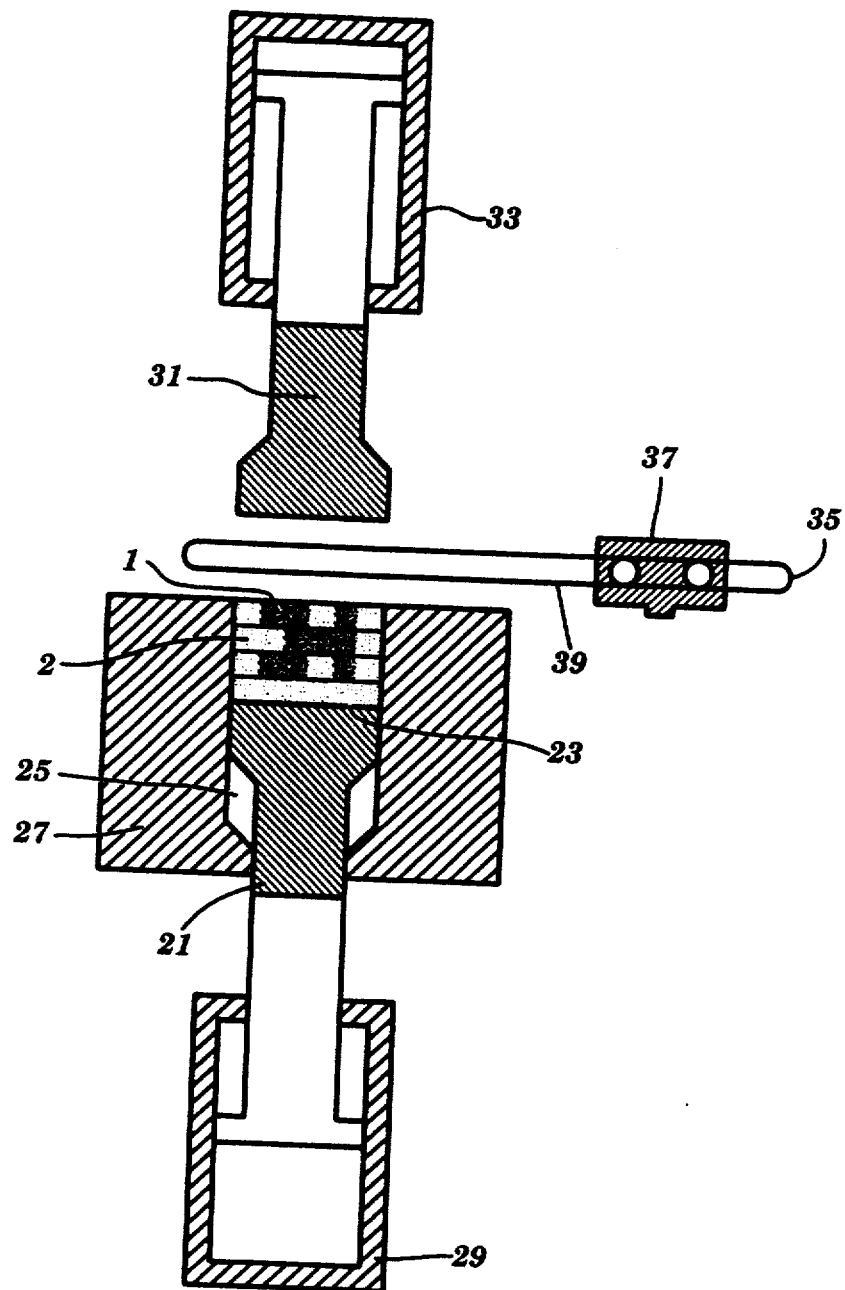
Figure 7A:
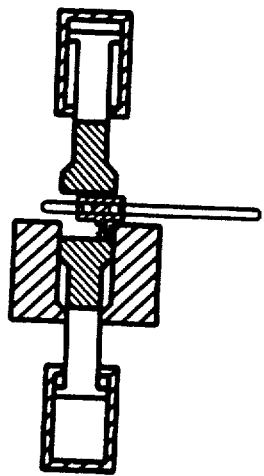
Figure 7B:
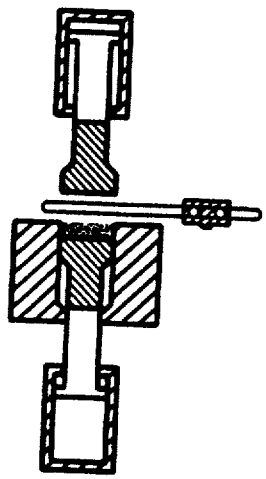
Figure 7C:
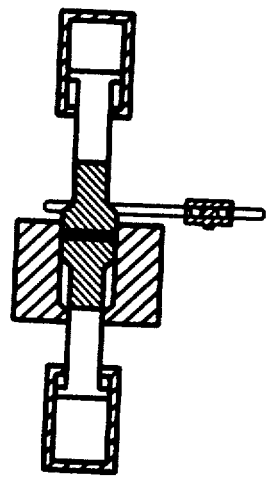
Figure 7D:
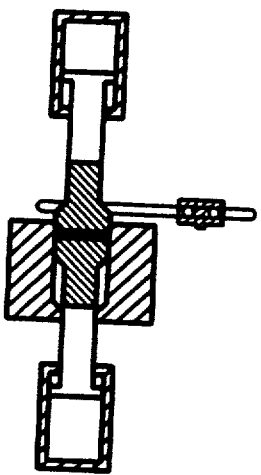
Figure 7E:
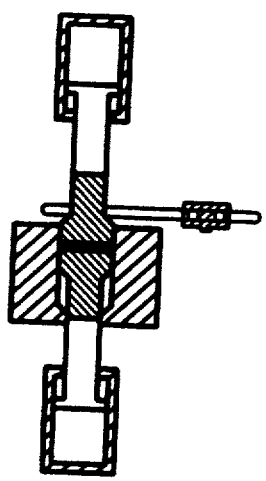
Figure 7F:
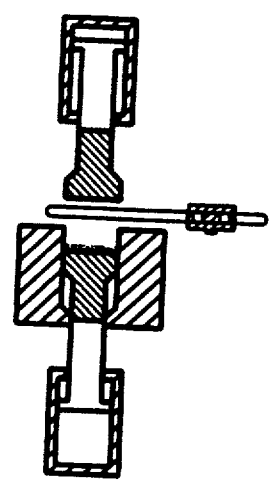
Figure 8:
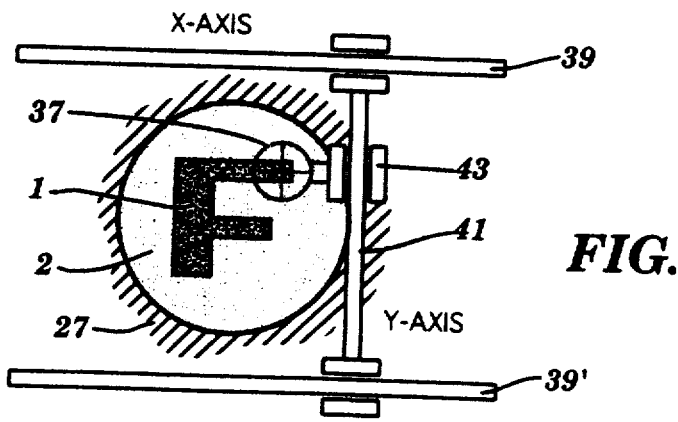
Figure 9:
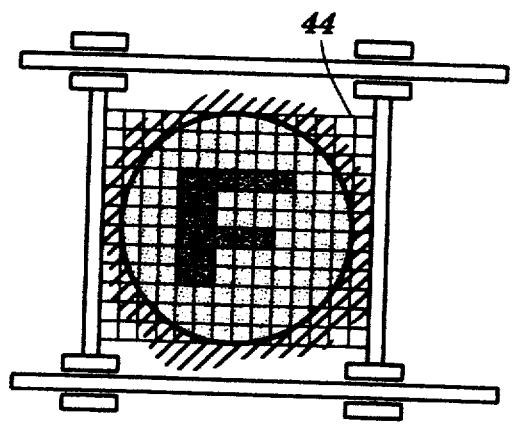
Figure 10:
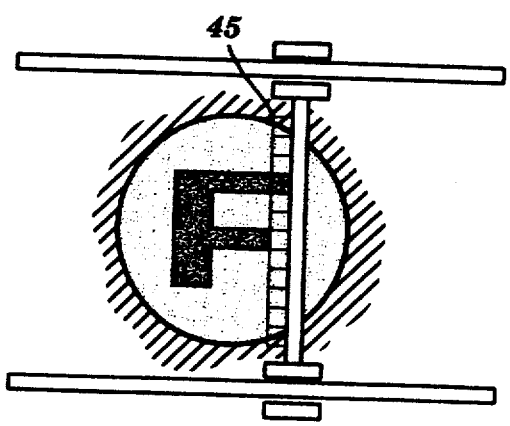

An alternative material deposition subsystem is shown in FIG. 9. In lieu of a single deposition effector, a deposition array 44 is used to deposit first class material and/or second class material at more than one point location at a time along the surface to be deposited thereupon. In this regard, the array material deposition subsystem is capable of performing parallel deposition. The deposition array 44 may utilize a plurality of individual deposition effectors which simultaneously deposit first class and/or second class material from material reservoir means. Alternatively, the deposition array may comprise an array of predeposited first class materials and/or second class materials which are then simultaneously deposited on the surface to be deposited thereupon. The deposition array 44 may comprise a two dimensional array as shown in FIG. 9. Alternatively, as shown in FIG. 10, the deposition array may comprise a single column array 45 capable of depositing only one column of first and/or second class materials simultaneously upon the surface to be deposited thereupon. It is also possible to deposit material in a parallel manner by linearly attaching a number of deposition effectors and translating them across the deposition surface normal to the linear direction in which they are arranged, and selectively activating the effectors during translation according to a geometric model slice corresponding to a particular layer being deposited. Using this technique, an entire layer of materials can be deposited with one pass across the deposition surface.

Additionally, the deposition effector translation approach described here and shown in FIG. 8 is not limited to a single deposition effector. The X-Y carriage is capable of translating more than one deposition effector. This enables simultaneous deposition of more than one material at each location along the path traversed by the X-Y carriage. This approach is particularly applicable when traversing the deposition paths defining the boundaries of a part of first class material and the remaining mass of second class material. Simultaneous deposition may create more sharply defined boundaries in the direction normal to the deposition surface between the two material classes within the layer.

In a preferred embodiment, the materials comprising first class and second class materials will be in a powdered state. A chemical additive, such as a binder, lubricant, or reaction inhibiting agent, may be used to improve the cohesion and/or flow properties of the first class and second class materials. Also in this preferred embodiment, the material deposition subsystem operates in a sequential manner with respect to each discrete material layer deposited to create the plurality of material layers which form a part after processing.

Although the invention has been described using the embodiments depicted herein, it will be apparent to one of ordinary skill in the art that the invention is not limited to such embodiments. Any modifications, substitutions or the like are intended to be within the scope of the invention as defined by the following claims.

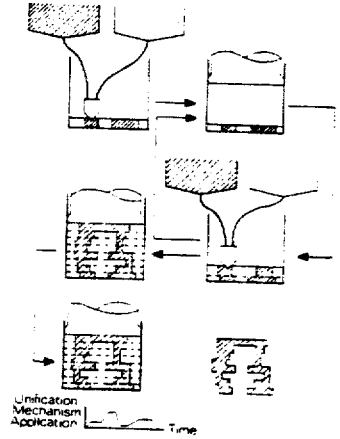

What is claimed is:

1. A method of producing parts comprising:

depositing a first class material and a second class material in multiple layers, wherein each layer of said multiple layers comprises the first class material and the second class material, and wherein the first class material forms a three dimensional shape defined by the interface of said first class material and said second class material;

compacting the deposited first class and second class material by exerting an external force thereto;

unifying the first class material after the steps of depositing and compacting all layers of said multiple layers; and removing the second class material from a three dimensional part formed of the first class material.

2. The method of claim 1 wherein each layer of first class material and second class material deposited is separately compacted by exerting on external force.

3. The method of claim 2 further comprising collectively compacting successive layers of first class material and second class material deposited by exerting on external force.

4. The method of claim 1 wherein a computer determines the thickness of the layers of the first class material and second class material deposited.

5. The method of claim 4 wherein said computer controls the location on a surface where the first class material and second class material are deposited for each layer.

6. The method of claim 5 wherein the first class material and second class material are deposited using a deposition effector, wherein said deposition effector is capable of traversing arbitrary paths above said deposition surface to selectively deposit first class material and second class material at various locations on said deposition surface.

7. The method of claim 6 wherein said deposition effector being controlled by said computer is capable of depositing said first class and second class material at discrete point locations and along curved paths.

8. The method of claim 1 wherein the unified first class material comprises a spatially controlled material composition comprising one or more distinct types of materials.

9. The method of claim 8 wherein said first class material is deposited in continuously varying concentrations of said distinct materials in three-dimensional part space to form a spatially controlled material composition part.

10. The method of claim 8 wherein said first class material is deposited at discrete locations in three-dimensional part space to form a spatially controlled material composition part.

11. The method of claim 8 wherein said spatially controlled material composition parts are produced in layers.

12. The method of claim 1 comprising:

(a) depositing an initial layer of second class material capable of acting as a buffer of non-unifying material between a first surface and a first class powder material;

(b) compacting the second class powdered material to a prescribed compaction pressure or volume by exerting an external force;

(c) depositing a layer of selectively placed powdered materials comprising first class material and second class material wherein the first class material deposited corresponds to a region of a part cross section;

(d) compacting the layer of selectively placed powdered materials by exerting an external force;

(e) repeating steps (c)–(d) to form a series of layers of deposited material;

(f) compacting the layers of deposited material formed in steps (a)–(e) at one or more preselected compaction pressures or volumes by exerting an external force; and (g) unifying the first class material and removing the compacted layers of second class material.

13. The method of claim 1 or 12 wherein unifying includes exposing the layers of materials to an elevated temperature.

14. The method of claim 1 or 12 wherein unifying includes exposing the layers of material to an elevated pressure.

15. The method of claim 1 or 12 wherein unifying is performed by an environment which selectively chemically activates the layered material to affect unification.

16. The method of claim 1 or 12 wherein the first class material is unified while leaving the second class material separate.

17. The method of claims 1 or 12 wherein the second class material is unified into a separate mass from the first class material which can be removed to form a solid part.

18. The method of claim 17 wherein the second class material is capable of being removed by mechanical means.

19. The method of claim 17 wherein the second class material is capable of being removed by chemical means without affecting the first class material.

20. The method of claim 1 wherein the first class material and second class material are compacted by a compacting system comprising:

a die having a cavity therein;

a first punch having said deposition surface engaged thereto, said first punch being vertically translatable within said cavity, thereby moving the vertical position of said deposition surface within said cavity;

means for moving a deposition effector at various locations above a deposition surface to allow said deposition effector to deposit said materials at preselected positions on said deposition surface; and a second punch being vertically translatable and having a contact surface capable of contacting materials deposited on said deposition surface.

\* \* \* \* \*

UNITED STATES PATENT AND TRADEMARK OFFICE
CERTIFICATE OF CORRECTION

PATENT NO. : 5,555,481
DATED : Sept. 10, 1996
INVENTOR(S) : Stephen J. Rock, et al.

It is certified that error appears in the above-identified patent and that said Letters Patent is hereby corrected as shown below:

The title page should be deleted to appear as per attached title page.

The drawing sheets consisting of sheets 1-9 should be deleted to appear as per attached drawing sheets 1-7.

Claim 2, at line 3, "on" should read --an--.

Clain 3, at line 3, "on" should read --an--.

Signed and Sealed this

Sixteenth Day of September, 1997

Attest:

BRUCE LEHMAN

Attesting Officer

Commissioner of Patents and Trademarks

United States Patent [19]

Rock et al.

[11] Patent Number: 5,555,481
[45] Date of Patent: Sep. 10, 1996

[54] METHOD OF PRODUCING SOLID PARTS USING TWO DISTINCT CLASSES OF MATERIALS

[75] Inventors: Stephen J. Rock; Charles R. Gilman, both of Troy, N.Y.

[73] Assignee: Rensselaer Polytechnic Institute, Troy, N.Y.

[21] Appl. No.: 509,730

[22] Filed: Aug. 1, 1995

Related U.S. Application Data

[63] Continuation of Ser. No. 152,406, Nov. 15, 1993, abandoned.

[51] Int. Cl.$^6$ .............................. B44C 1/22; B22F 7/02
[52] U.S. Cl. ............................. 419/30; 419/45; 419/56; 29/420.1; 29/239
[58] Field of Search .................. 419/30, 45, 56; 29/426.1, 239

[56] References Cited

U.S. PATENT DOCUMENTS

| | | | |
|---|---|---|---|
| 4,247,508 | 1/1981 | Housholder | 264/219 |
| 4,414,028 | 11/1983 | Inoue | 419/31 |
| 4,752,352 | 6/1988 | Feygin | 156/630 |
| 4,830,822 | 5/1989 | Ward | 428/547 |
| 4,863,538 | 9/1989 | Deckard | 156/62.2 |
| 4,961,154 | 10/1990 | Pomerantz et al. | 364/522 |
| 5,038,014 | 8/1991 | Pratt et al. | 219/121.64 |
| 5,126,529 | 6/1992 | Weiss et al. | 219/121.6 |
| 5,203,944 | 4/1993 | Prinz et al. | 156/247 |
| 5,204,055 | 4/1993 | Sachs et al. | 419/2 |
| 5,207,371 | 5/1993 | Prinz et al. | 228/125 |
| 5,260,009 | 11/1993 | Penn | 264/40.1 |
| 5,354,414 | 10/1994 | Feygin | 156/630 |

OTHER PUBLICATIONS

Marcus, Beaman, Barlow and Bourell; "From Computer to Component in 15 Minutes: The Integrated Manufacture of 3-Dimensional Objects"; *Journal of Metals;* Apr., 1990; pp. 8–10.

*Rapid Prototyping Report* The newsletter of the desktop manufacturing industry; vol. 3, No. 9; Sep., 1993; pp. 1–8.

Zong, Carnes, Wheat and Marcus; "Solid Freeform Fabrication by Selective Area Laser Deposition"; Center for Materials Science & Engineering The University of Texas at Austin, Austin, Texas; pp. 83–90.

Badrinarayan and Barlow; "Metals Parts From Selective Laser Sintering of Metal-Polymer Powders" from Solid Freeform Fabrication Proceedings; Sep., 1992 sponsored by the University of Texas at Austin; pp. 141–146.

Michaels, Sachs, and Cima; "Metal Parts Generation by 3–Dimensional Printing" from Solid Freeform Fabrication Proceedings; Sep., 1992 sponsored by The University of Texas at Austin; pp. 244–250.

Allanic, Medard and Schaeffer; "Stereophotolithography: A Brand New Machinery" from Solid freeform Fabrication Proceedings; Sep., 1992 sponsored by The University of Texas at Austin; pp. 260–271.

Beck, Prinz, Siewiorek, Weiss; "Manufacturing Mechatronics Using Thermal Spray Shape Deposition"; from Solid Freeform Fabrication Proceedings; Sep. 1992 sponsored by The University of Texas at Austin; pp. 272–279.

(List continued on next page.)

*Primary Examiner*—Charles T. Jordan
*Assistant Examiner*—Daniel Jenkins
*Attorney, Agent, or Firm*—Heslin & Rothenberg, P.C.

[57] ABSTRACT

A method of producing parts from two distinct classes of materials utilizes depositing a first class material and a second class material on a deposition surface where the first class material forms a three-dimensional shape defined by the interface of the first class material and the second class material. The first class material is unified and the second class material is removed therefrom to form a three-dimensional part of the first class material. Preferably, the first and second class materials are deposited in layers.

20 Claims, 7 Drawing Sheets